United States Patent
Tamagawa (10) Patent No.: US 9,428,041 B2
(45) Date of Patent: Aug. 30, 2016

(54) HYBRID VEHICLE AND CONTROL METHOD THEREOF

(75) Inventor: Yutaka Tamagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/513,515

(22) PCT Filed: Dec. 9, 2010

(86) PCT No.: PCT/JP2010/072177
§ 371 (c)(1),
(2), (4) Date: Jun. 1, 2012

(87) PCT Pub. No.: WO2011/074482
PCT Pub. Date: Jun. 23, 2011

(65) Prior Publication Data
US 2012/0245783 A1    Sep. 27, 2012

(30) Foreign Application Priority Data
Dec. 16, 2009    (JP) .................................. 2009-285415

(51) Int. Cl.
*B60K 6/42*          (2007.10)
*B60K 6/442*        (2007.10)
(Continued)

(52) U.S. Cl.
CPC .............. *B60K 6/442* (2013.01); *B60L 11/123* (2013.01); *B60L 11/14* (2013.01); *B60L 15/2045* (2013.01);
(Continued)

(58) Field of Classification Search
CPC .............. B60W 2710/081; B60W 2710/0644; B60W 2710/244; B60W 2710/083; B60W 2710/025; B60W 2710/0666; B60K 6/387; B60K 6/46; B60K 6/485; Y02T 10/48; Y02T 10/56; Y02T 10/6226; Y02T 10/7258
USPC ........ 701/22, 102, 110, 54, 68; 477/5, 7, 15; 290/17; 180/65.235, 65.25, 65.26
See application file for complete search history.

(56) References Cited

U.S. PATENT DOCUMENTS 4,938,102 A    7/1990   Leising et al.
4,982,620 A    1/1991   Holbrook et al.
(Continued)

FOREIGN PATENT DOCUMENTS

CN        1421336 A     6/2003
CN        1684850 A    10/2005
(Continued)

OTHER PUBLICATIONS

Chinese Office Action dated May 23, 2014, issued in Chinese Patent Application No. 201080053021.X (6 pages).
(Continued)

*Primary Examiner* — Jelani Smith
(74) *Attorney, Agent, or Firm* — Westerman, Hattori, Daniels & Adrian, LLP (57) ABSTRACT

A hybrid vehicle includes an engine control unit for controlling an engine, an engaging/disengaging control unit for engaging a clutch when the hybrid vehicle is shifted from a series drive mode to another drive mode in which at least the engine works as a drive source, a required output calculation unit for calculating a required output, and an engaging revolution speed calculation unit for calculating a revolution speed at a drive wheel side of the clutch. The engaging/disengaging control unit engages the clutch when the revolution speed of the engine coincides with the engaging revolution speed as a result of controlling the engine to follow the required output while the hybrid vehicle is running on the series drive mode at a predetermined vehicle speed or faster.

5 Claims, 8 Drawing Sheets

(51) Int. Cl.

| | | |
|---|---|---|
| *B60L 11/12* | (2006.01) | |
| *B60L 11/14* | (2006.01) | |
| *B60L 15/20* | (2006.01) | |
| *B60W 10/02* | (2006.01) | |
| *B60W 10/06* | (2006.01) | |
| *F02D 29/02* | (2006.01) | |
| *B60W 20/00* | (2016.01) | |

(52) U.S. Cl.
CPC ............. *B60W 10/02* (2013.01); *B60W 10/06* (2013.01); *B60W 20/20* (2013.01); *F02D 29/02* (2013.01); *B60L 2240/421* (2013.01); *B60W 20/00* (2013.01); *B60W 2510/0241* (2013.01); *B60W 2710/081* (2013.01); *Y02T 10/6217* (2013.01); *Y02T 10/6234* (2013.01); *Y02T 10/642* (2013.01); *Y02T 10/7077* (2013.01); *Y02T 10/7283* (2013.01)

(56) References Cited

U.S. PATENT DOCUMENTS

| | | | |
|---|---|---|---|
| 5,211,080 | A | 5/1993 | Leising et al. |
| 5,495,906 | A | 3/1996 | Furutani |
| 5,993,351 | A | 11/1999 | Deguchi et al. |
| 6,083,138 | A * | 7/2000 | Aoyama et al. .................. 477/5 |
| 6,083,139 | A | 7/2000 | Deguchi et al. |
| 6,175,785 | B1 | 1/2001 | Fujisawa et al. |
| 6,190,282 | B1 | 2/2001 | Deguchi et al. |
| 6,380,640 | B1 | 4/2002 | Kanamori et al. |
| 6,566,826 | B2 * | 5/2003 | Imai et al. ...................... 318/11 |
| 7,279,855 | B2 | 10/2007 | Tahara et al. |
| 7,576,501 | B2 | 8/2009 | Okubo et al. |
| 7,819,212 | B2 | 10/2010 | Kawasaki |
| 8,571,734 | B2 | 10/2013 | Yamamoto et al. |
| 8,571,737 | B2 | 10/2013 | Tamagawa |
| 2002/0024306 | A1 * | 2/2002 | Imai et al. ...................... 318/34 |
| 2003/0102175 | A1 * | 6/2003 | Wakashiro et al. .......... 180/65.4 |
| 2003/0173123 | A1 | 9/2003 | Nakanowatari |
| 2004/0006414 | A1 | 1/2004 | Suzuki |
| 2006/0152180 | A1 | 7/2006 | Tahara et al. |
| 2006/0272869 | A1 * | 12/2006 | Hidaka et al. ................ 180/65.2 |
| 2007/0255477 | A1 * | 11/2007 | Okuda .................... B60K 6/442 701/93 |
| 2007/0275819 | A1 * | 11/2007 | Hirata ............................... 477/5 |
| 2008/0091314 | A1 | 4/2008 | Hayashi et al. |
| 2008/0215201 | A1 | 9/2008 | Okubo et al. |
| 2009/0118949 | A1 | 5/2009 | Heap et al. |
| 2009/0143189 | A1 * | 6/2009 | Hasegawa et al. ............... 477/5 |
| 2009/0171523 | A1 * | 7/2009 | Luo et al. ....................... 701/22 |
| 2009/0200095 | A1 | 8/2009 | Kawasaki |
| 2009/0236159 | A1 * | 9/2009 | Shibata et al. ........... 180/65.235 |
| 2009/0250278 | A1 | 10/2009 | Kawasaki et al. |
| 2009/0314565 | A1 | 12/2009 | Suzuki |
| 2010/0075798 | A1 * | 3/2010 | Suzuki et al. ..................... 477/5 |
| 2010/0198439 | A1 | 8/2010 | Ishii |
| 2010/0204862 | A1 | 8/2010 | Uejima et al. |
| 2010/0258366 | A1 | 10/2010 | Kim |
| 2010/0323844 | A1 | 12/2010 | Okubo et al. |
| 2011/0015811 | A1 | 1/2011 | Okubo et al. |
| 2011/0022260 | A1 | 1/2011 | Ichikawa |
| 2011/0313602 | A1 | 12/2011 | Hirata et al. |
| 2012/0116629 | A1 | 5/2012 | Kamoshida |
| 2012/0245783 | A1 | 9/2012 | Tamagawa |
| 2012/0245785 | A1 | 9/2012 | Tamagawa |
| 2012/0259496 | A1 | 10/2012 | Ikegami |
| 2013/0103242 | A1 | 4/2013 | Takeuchi et al. |

FOREIGN PATENT DOCUMENTS

| | | |
|---|---|---|
| CN | 101428614 A | 5/2009 |
| CN | 101445039 A | 6/2009 |
| EP | 1731802 A2 | 12/2006 |
| JP | 08-098322 | 4/1996 |
| JP | 09-224304 A | 8/1997 |
| JP | 11-089007 A | 3/1999 |
| JP | 11-122824 A | 4/1999 |
| JP | 11-165566 A | 6/1999 |
| JP | 11-178110 A | 7/1999 |
| JP | 2000-023311 A | 1/2000 |
| JP | 3052753 B2 | 4/2000 |
| JP | 2000-136835 A | 5/2000 |
| JP | 2000-236601 A | 8/2000 |
| JP | 2002-238104 A | 8/2002 |
| JP | 2003-237392 A | 8/2003 |
| JP | 2003-269208 A | 9/2003 |
| JP | 2006-020401 A | 1/2006 |
| JP | 2006-335196 A | 12/2006 |
| JP | 2007-022118 A | 2/2007 |
| JP | 2007-118722 | 5/2007 |
| JP | 2007-314097 | 12/2007 |
| JP | 2008-87703 A | 4/2008 |
| JP | 2009-006829 A | 1/2009 |
| JP | 2009-274566 A | 11/2009 |
| JP | 2009-280082 A | 12/2009 |
| JP | 2009-292287 A | 12/2009 |
| JP | 2010-125956 A | 6/2010 |
| WO | 2011/074482 A1 | 6/2011 |
| WO | 2011/078189 A1 | 6/2011 |

OTHER PUBLICATIONS

Chinese Office Action dated Apr. 10, 2014; Chinese Application No. 201080054900.4.
Substantive Examination Office Action issued from Russian Application No. 2012127408, dated Feb. 13, 2014, 13 pages.
Extended European Search Report dated Sep. 25, 2014, issued in the related European patent application No. 10839419.8 (6 pages).
Extended European Search Report dated Sep. 15, 2014, issued in the related European patent application No. 10839419.8 (6 pages).
U.S. Office Action dated Nov. 14, 2014, issued in related U.S. Appl. No. 14/278,016 (17 pages).
International Search Report dated Jan. 11, 2011, issued in related PCT/JP2010/072178 (1 page).
U.S. Office Action dated Dec. 13, 2013, issued in related U.S. Appl. No. 13/514,231 (7 pages).
U.S. Notice of Allowance dated Apr. 15, 2014, issued in related U.S. Appl. No. 13/514,231 (7 pages).
U.S. Notice of Allowance dated Jun. 25, 2013, issued in related U.S. Appl. No. 13/514,582 (9 pages).
U.S. Notice of Allowance dated Feb. 14, 2014, issued in related U.S. Appl. No. 14/037,019 (8 pages).
International Search Report dated Mar. 1, 2011, issued in related PCT/JP2010/073048 (2 pages).
International Search Report dated Jan. 11, 2011, issued in related PCT/JP2010/072177 (1 page).
U.S. Quayle Action dated Nov. 25, 2013, issued in related U.S. Appl. No. 14/037,019 (7 pages).
Non-Final Office Action dated Jul. 9, 2015, issued in U.S. Appl. No. 14/332,172 (29 pages).
Office Action dated Jul. 21, 2015, issued in counterpart Japanese Patent Application No. 2014-131628 (2 pages).
Office Action dated Jul. 14, 2015, issued in counterpart Japanese Patent Application No. 2014-131627 (4 pages).
Office Action dated May 12, 2015, issued in Japanese Patent Application No. 2014-081781 (2 pages).

* cited by examiner

HYBRID VEHICLE AND CONTROL METHOD THEREOF

CROSS-REFERENCED TO RELATED APPLICATION

This application is a National Stage entry of International Application PCT/JP2010/072177, filed Dec. 9, 2010, which claims priority to Japanese Patent Application No. 2009-285415, filed Dec. 16, 2009, the disclosure of the prior applications are hereby incorporated in its entirety by reference.

TECHNICAL FIELD

The present invention relates to a hybrid vehicle which controls the engagement of a power transmission engaging/disengaging unit which is executed when the vehicle is shifted from a series drive mode in which an electric motor works as a drive source to another drive mode in which at least an internal combustion engine works as a drive source, and a control method thereof.

BACKGROUND ART

In a series and parallel combined electric vehicle (SPHV) disclosed in Patent Literature 1, when the vehicle is shifted from a series hybrid vehicle (SHV) mode to a parallel hybrid vehicle (PHV) mode without using a continuously variable transmission, the torque of a motor is controlled at a time point when the vehicle speed (the revolution speed of the motor) reaches a predetermined value V1, and the revolution speed of a generator is made to gradually approximate to the revolution speed of the motor. Thereafter, the clutch is put on at a time point when both the revolution speeds coincide with each other and the vehicle speed reaches a predetermined value V2, so that the generator and the motor are mechanically coupled together. In this way, in Patent Literature 1, it is described that the difference in revolution speed between the generator and the motor is eliminated when the clutch is put on and therefore, no shock is generated when the drive modes are switched over.

RELATED ART LITERATURE

Patent Literature

Patent Literature 1: JP-3052753-B
Patent Literature 2: JP-H09-224304-A

OUTLINE OF THE INVENTION

Problems to be Solved by the Invention

In the SPHV of Patent Literature 1 described above, the coincidence of the revolution speed of the generator with the revolution speed of the motor is taken as a condition of engagement of the clutch which is executed when the drive mode is switched from the SHV mode to the PHV mode. However, it is considered that a shock is generated when the clutch is engaged in such a state that the output of the generator differs from the output of the motor even though the two revolution speeds coincide with each other. Namely, in the SPHV of Patent Literature 1, not only does the revolution speed of the generator have to coincide with the revolution speed of the motor, but also symbols of respective angular speeds of the revolution speeds have to coincide with each other and the output of the generator has to be approximate to the output of the motor.

Figure 7:
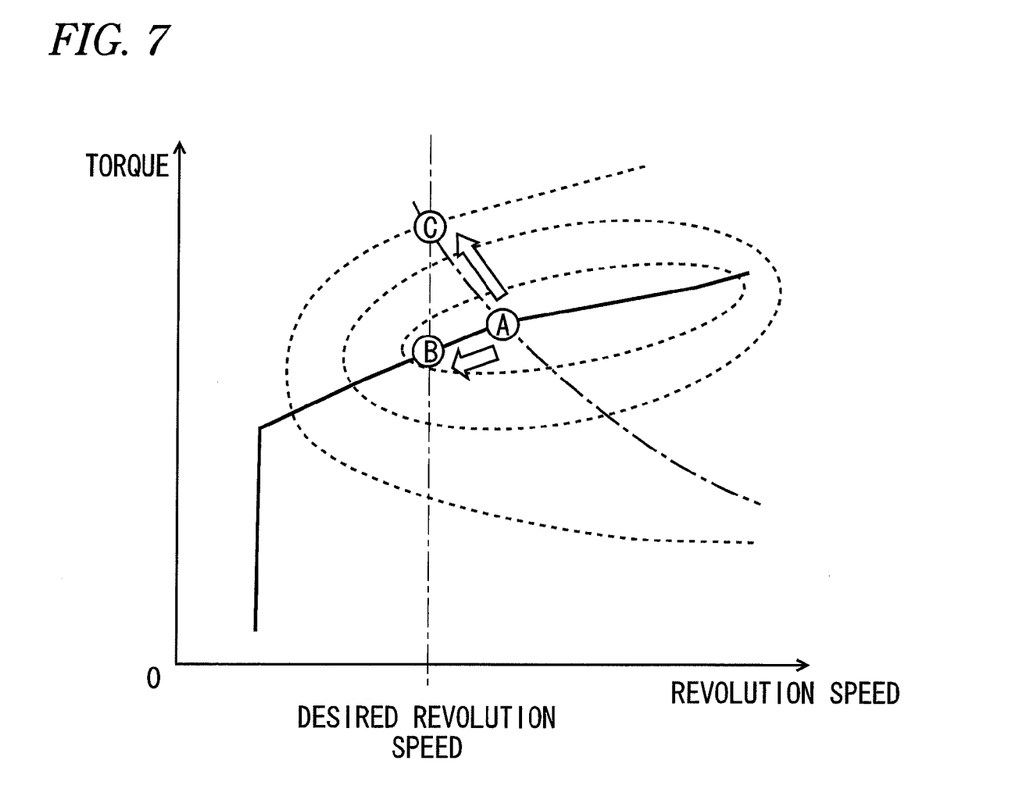
FIG. 7 shows example characteristics of the engine which drives a generator.
Figure 8:
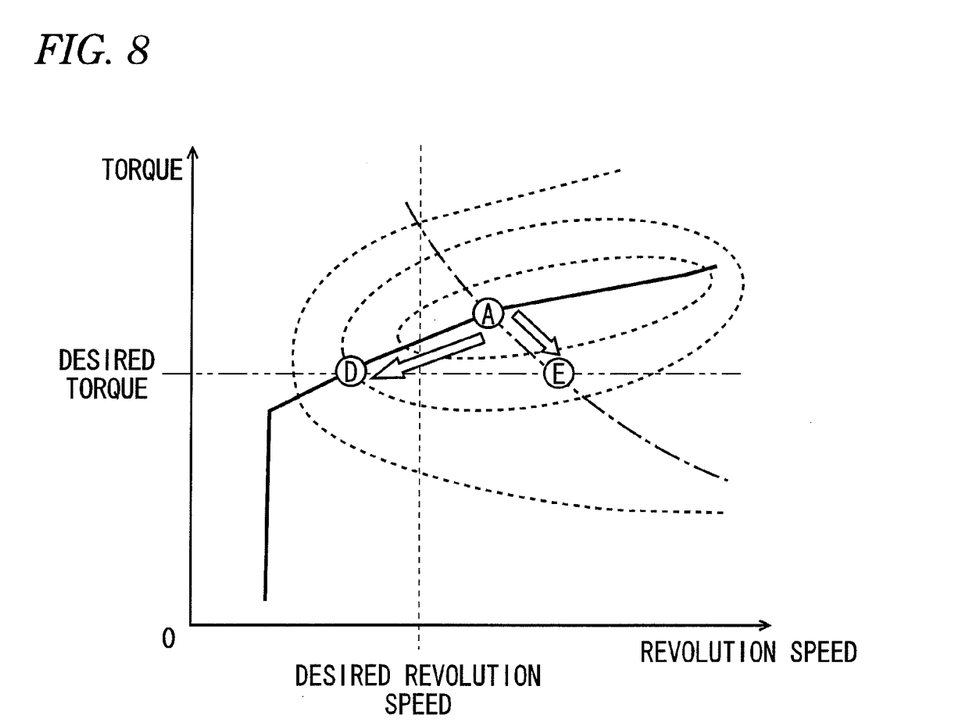
FIG. 8 shows example characteristics of the engine which drives the generator.

FIGS. 7 and 8 show example characteristics of the engine which drives the generator. In FIGS. 7 and 8, an ordinates axis denotes the torque of the engine, and an abscissas axis denotes the revolution speed of the engine. In FIGS. 7 and 8, thick solid lines are lines which connect operation points of the engine where an optimum specific fuel consumption is attained (hereinafter, referred to as a "BSFC bottom line"). When in the SHV mode, the engine is operated at an operation point on the line. Additionally, in FIGS. 7 and 8, alternate long and short dash lines are lines which connect operation points of the engine where the outputs of the engine become identical although the torque and revolution speeds are different (hereinafter, referred to as an "equal-output line").

When the drive mode of the SPHV of Patent Literature 1 which is in the SHV mode is switched to the PHV mode with the engine operated at an operation point A shown in FIG. 7, the revolution speed of the engine is dropped to a value indicated by a chain double-dashed line in FIG. 7 (a desired revolution speed) so that the revolution speed of the generator approximates to the revolution speed of the motor. In this state, when attempting to maintain the specific fuel consumption, the operation point shifts from A to B along the BSFC bottom line. As a result, the torque and revolution speed of the engine also drop, and therefore, the output of the engine also decreases. As this occurs, the generator cannot supply all the electric power that is required by the motor, resulting in a situation in which the insufficient electric power is supplied by the battery.

On the other hand, when the operation point is shifted from A to C along the equal-output line so as to maintain the output of the engine under the same conditions, the operation point deviates from the BSFC bottom line, and therefore, the specific fuel consumption is deteriorated.

On the other hand, this will be true when the torque of the engine is changed in switching the drive mode from the SHV mode to the PHV mode. As shown in FIG. 8, when the drive mode is switched to the PHV mode with the engine operated at the operation point A, the torque of the engine is caused to drop to a value indicated by a chain double-dashed line in FIG. 8 (a desired torque). In this state, when attempting to maintain the specific fuel consumption, the operation point shifts from A to D along the BSFC bottom line. As a result, the revolution speed of the generator which corresponds to the revolution speed of the engine does not coincide with the revolution speed of the motor, and therefore, it is considered that a shock is generated when the clutch is engaged in this state. Additionally, the revolution speed of the engine also drops, whereby the output of the engine decreases. As this occurs, the generator cannot supply all the electric power that is required by the motor, and therefore, there can be caused a situation in which the insufficient electric power is supplied by the battery.

On the other hand, when the operation point is caused to shift from A to E along the equal-output line so as to maintain the output of the engine under the same conditions, the operation point deviates from the BSFC bottom line, and therefore, the specific fuel consumption is deteriorated.

An object of the invention is to provide a hybrid vehicle which can engage a power transmission engaging/disengaging unit without generation of a shock and deterioration of efficiency when the vehicle is shifted from a series drive mode in which an electric motor works as a drive source to another drive mode in which at least an internal combustion engine works as a drive source and a control method thereof.

Means for Solving the Problems

A first aspect of the present application provides a hybrid vehicle including
an engine (e.g., an engine 111 in embodiment),
a generator (e.g., a generator 113 in embodiment) which is driven by the engine to generate electric power,
a battery (e.g., a battery 101 in embodiment) for supplying electric power to an electric motor,
the electric motor (e.g., an electric motor 109 in embodiment) which is connected to a drive wheel (e.g., a drive wheel 133 in embodiment) and which is driven by electric power supplied from at least one of the battery and the generator, and
a power transmission engaging/disengaging unit (e.g., a lockup clutch 117 in embodiment) which is disposed between the generator and the drive wheel for engaging and disengaging a power transmission line from the engine to the drive wheel via the generator, the hybrid vehicle being capable of running on power supplied from at least one of the electric motor and the engine,
the hybrid vehicle further including
an engine control unit (e.g., a management ECU 123 in embodiment) for controlling the engine,
an engaging/disengaging control unit (e.g., the management ECU 123 in embodiment) for controlling the power transmission engaging/disengaging unit to be engaged when the hybrid vehicle is shifted from a series drive mode in which the electric motor works as a drive source to another drive mode in which at least the engine works as a drive source,
a required output calculation unit (e.g., the management ECU 123 in embodiment) for calculating a required output required of the hybrid vehicle based on an accelerator pedal opening which corresponds to an operation of an accelerator pedal and a running speed of the hybrid vehicle, and
an engaging revolution speed calculation unit (e.g., the management ECU 123 in embodiment) for calculating a revolution speed at a drive wheel side of the power transmission engaging/disengaging unit which corresponds to the vehicle speed as a revolution speed of the engine at which the power transmission engaging/disengaging unit is engaged,
wherein the engaging/disengaging control unit controls the power transmission engaging/disengaging unit to be engaged when the revolution speed of the engine coincides with the engaging revolution speed (e.g., a clutch engaging revolution speed in embodiment) calculated by the engaging revolution speed calculation unit as a result of controlling the engine to follow the required output calculated by the required output calculation unit while the hybrid vehicle is running on the series drive mode at a predetermined vehicle speed or faster.

A second aspect of the present application provides the hybrid vehicle,
wherein, when the revolution speed of the engine is faster than the engaging revolution speed while the hybrid vehicle is running on the series drive mode at a predetermined vehicle speed or faster, the engine control unit controls the engine to operate on an optimum fuel consumption line (e.g., a BSFC bottom line in embodiment) which connects operation points where an optimum specific fuel consumption is attained in accordance with the required output.

A third aspect of the present application provides the hybrid vehicle,
wherein, when the revolution speed of the engine is slower than the engaging revolution speed while the hybrid vehicle is running on the series drive mode at a predetermined vehicle speed or faster, the engine control unit controls the engine to operate on an equal-output line which connects operation points where an output in accordance with the required output can be maintained.

A fourth aspect of the present application provides the hybrid vehicle,
wherein an energy transmission efficiency from the engine to the drive wheel at an operation point at which the operation point of the engine arrives after shifting on the equal-output line and where the revolution speed of the engine coincides with the engaging revolution speed is better with mechanical efficiency than with electrical efficiency.

A fifth aspect of the present application provides the hybrid vehicle,
wherein the engine control unit controls the engine to increase the torque while keeping the revolution speed at the engaging revolution speed until the operation point of the engine reaches the optimum fuel consumption line when the required output increases after the power transmission engaging/disengaging unit is engaged, and
wherein, when the required output exceeds the output of the engine at the operation point on the optimum fuel consumption line, the electric motor driven by electric power supplied from the battery outputs electric power corresponding to the insufficient output of the engine.

A sixth aspect of the present application provides the hybrid vehicle,
wherein the electric motor outputs electric power corresponding to the insufficient output within an available outputting capacity according to the state of the battery.

A seventh aspect of the present application provides a control method for a hybrid vehicle,
the hybrid vehicle including
an engine (e.g., an engine 111 in embodiment),
a generator (e.g., a generator 113 in embodiment) which is driven by the engine to generate electric power,
a battery (e.g., a battery 101 in embodiment) for supplying electric power to an electric motor,
the electric motor (e.g., an electric motor 109 in embodiment) which is connected to a drive wheel (e.g., a drive wheel 133 in embodiment) and which is driven by electric power supplied from at least one of the battery and the generator, and
a power transmission engaging/disengaging unit (e.g., a lockup clutch 117 in embodiment) which is disposed between the generator and the drive wheel for engaging and disengaging a power transmission line from the engine to the drive wheel via the generator, the hybrid vehicle being capable of running on power supplied from at least one of the electric motor and the engine,
the control method including
calculating a revolution speed at a drive wheel side of the power transmission engaging/disengaging unit which corresponds to the vehicle speed of the hybrid vehicle as a revolution speed of the engine at which the power transmission engaging/disengaging unit is engaged when the hybrid vehicle runs on a series drive mode in which the electric motor works as a drive source,
calculating a required output required of the hybrid vehicle based on an accelerator pedal opening which corresponds to an operation of an accelerator pedal and a running speed of the hybrid vehicle, and
engaging the power transmission engaging/disengaging unit when the revolution speed of the engine coincides with the engaging revolution speed calculated as a result of controlling the engine to follow the required output calculated while the hybrid vehicle is running on the series drive mode at a predetermined vehicle speed or faster.

According to the first to seventh aspects, for example, when the vehicle is shifted from the series drive mode in which the electric motor works as a drive source to the another drive mode in which at least the engine works as a drive source, the power engaging/disengaging unit can be engaged without generation of a shock and reduction in efficiency.

According to the second aspect, the engine continues to operate on the optimum specific fuel consumption line, and the power transmission engaging/disengaging unit is engaged when the revolution speed of the engine coincides with the engaging revolution speed, and therefore, the specific fuel consumption of the engine is not decreased.

According to the third and fourth aspects, the specific fuel consumption of the engine is decreased because the operation point of the engine shifts on the equal-output line. However, the mechanical efficiency is better than the electrical efficiency at the operation point of the engine where the power transmission engaging/disengaging unit is engaged, and therefore, the hybrid vehicle can run with a better overall efficiency than an overall efficiency which would result when the hybrid vehicle continues to run on the series drive mode.

According to the fifth and sixth aspects, the electric motor outputs electric power corresponding to the insufficient output of the engine by which the required output exceeds the output of the engine at the operation point on the optimum fuel consumption line. Therefore, the engine can continue to operate while keeping the better overall efficiency.

MODE FOR CARRYING OUT THE INVENTION

Embodiments of the invention will be described by reference to the drawings.

An HEV (Hybrid Electric Vehicle) includes an electric motor and an engine and runs on driving force of the electric motor and/or the engine depending upon running conditions of the vehicle. HEVs are roughly classified into two types; a series HEV and a parallel HEV. The series HEV runs on the driving force of the electric motor. The engine is used only for generation of electric power, and electric power generated by making use of the driving force of the engine is stored in a battery or supplied to the electric motor. On the other hand, the parallel HEV runs on driving force of either or both of the electric motor and the engine.

There is also known a series/parallel HEV in which both the series and parallel configurations are combined. In this type of HEV, a clutch is engaged or disengaged (engaged/disengaged) depending upon the running conditions of the vehicle, whereby the transmission system of driving force is switched to either of the series and parallel configurations. In particular, when the vehicle runs at low speeds, the clutch is disengaged to adopt the series configuration, while when the vehicle runs at intermediate or high speeds, the clutch is engaged to adopt the parallel configuration. In the following description, a drive mode using the series configuration will be referred to as a "series drive mode."

Figure 1:
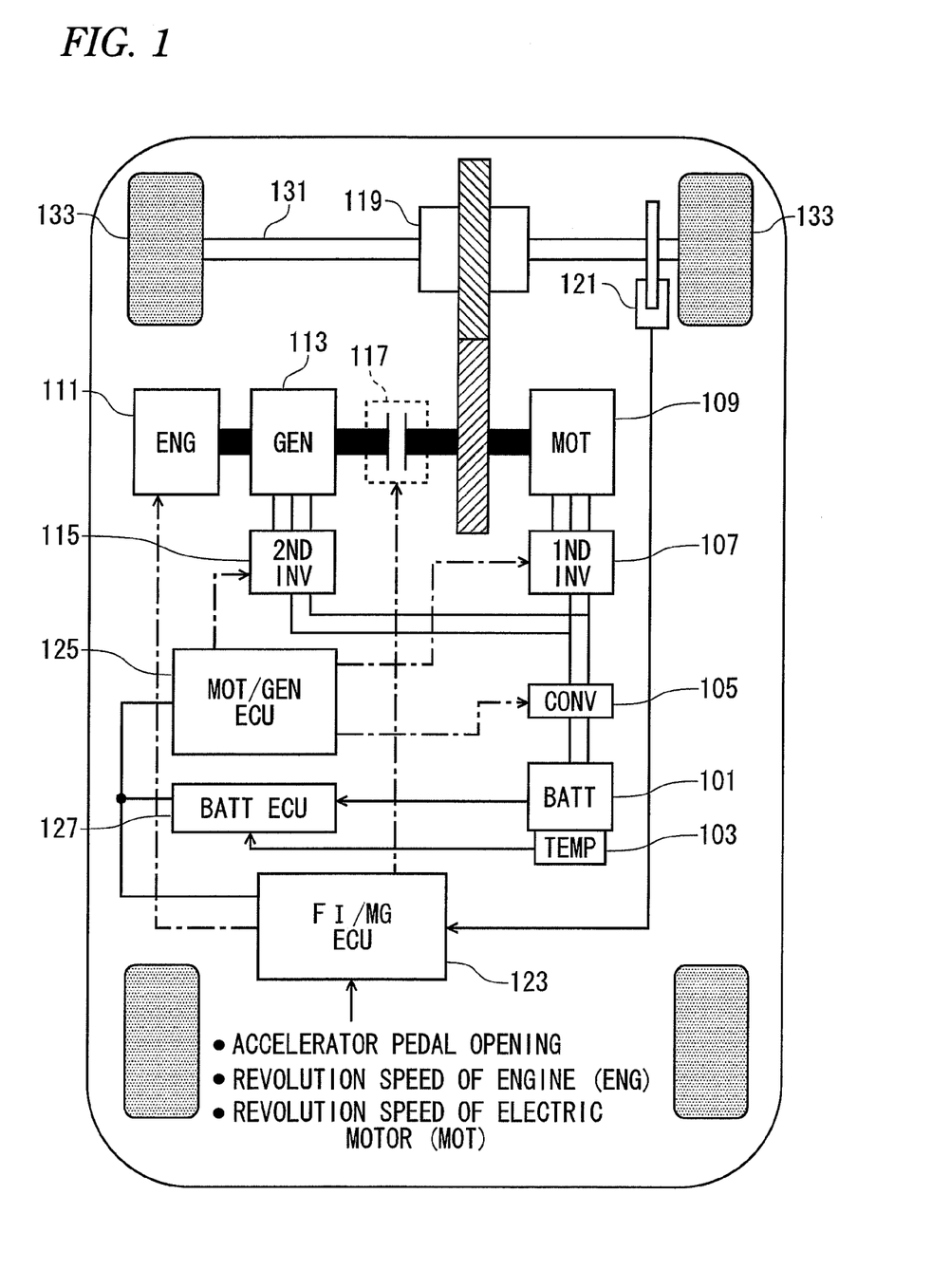
FIG. 1 shows an internal block configuration of a series/parallel HEV.

In an embodiment, a hybrid vehicle according to the invention will be described as a series/parallel HEV (hereinafter, referred to as a "hybrid vehicle"). FIG. 1 shows an internal block configuration of the series/parallel HEV. The hybrid vehicle shown in FIG. 1 includes a battery (BATT) 101, a temperature sensor 103 (TEMP), a converter (CONV) 105, a first inverter (1$^{st}$ INV) 107, an electric motor (MOT) 109, an engine (ENG) 111, a generator (GEN) 113, a second inverter (2$^{nd}$ INV) 115, a lockup clutch (hereinafter, referred to simply as a "clutch") 117, a gearbox (hereinafter, referred to simply as a "gear") 119, a vehicle speed sensor 121, a management ECU (FI/MG ECU) 123, a motor ECU (MOT/GEN ECU) 125 and a battery ECU (BATT ECU) 127. Further, the vehicle includes a sensor (not shown) for detecting a revolution speed of the electric motor 109 and a sensor (not shown) for detecting a revolution speed of the engine 111.

The battery 101 has plural battery cells which are connected in series and supplies, for example, a high voltage of 100 to 200V. The battery cells are lithium ion batteries or nickel-metal hydride batteries. The temperature sensor 103 detects a temperature of the battery 101 (hereinafter, referred to as a "battery temperature"). A signal indicating the battery temperature detected by the temperature sensor 103 is sent to the battery ECU 127.

The converter 105 increases or decreases a direct current output voltage of the battery 101 while keeping it as direct current. The first inverter 107 converts a direct current voltage into an alternating current voltage so as to supply a three-phase current to the electric motor 109. Additionally, the first inverter 107 converts an alternating current voltage which is inputted when the electric motor 109 performs a regenerative operation into a direct current voltage for storage in the battery 101.

The electric motor 109 generates power on which the vehicle runs. Torque generated in the electric motor 109 is transmitted to drive shafts 131 via the gear 119. Note that a rotor of the electric motor 109 is connected directly to the gear 119. Additionally, the electric motor 109 operates as a generator when regenerative brakes are applied, and electric power generated in the electric motor 109 is stored in the battery 101.

The engine 111 is used only for the generator 113 when the hybrid vehicle runs on the series drive mode with the clutch 117 disengaged. However, when the clutch 117 is engaged, the output of the engine 111 is transmitted to the drive shafts 131 via the generator 113, the clutch 117 and the gear 119 as mechanical energy necessary to drive the hybrid vehicle. The engine 111 is connected directly to a rotor of the generator 113.

The generator 113 generates electric power by making use of the power of the engine 111. The electric power generated by the generator 113 is stored in the battery 101 or is supplied to the electric motor 109. The second converter 115 converts an alternating current generated in the generator 113 into a direct current voltage. The electric power converted by the second inverter 115 is stored in the battery 101 or is supplied to the electric motor 109 via the first converter 107.

The clutch 117 engages or disengages a driving force transmission line from the engine 111 to the drive wheels 133 based on an instruction from a management ECU 123. The gear 119 is a single speed fixed gear which corresponds to a fifth speed, for example. Consequently, the gear 119 converts a driving force from the engine 111 via the generator 113 or a driving force from the electric motor 109 into a revolution speed and torque at a specific gear ratio for transmission to the drive shafts 131. The vehicle speed sensor 121 detects a running speed of the vehicle (a vehicle speed). A signal indicating the vehicle speed detected by the vehicle speed sensor 121 is sent to the management ECU 123.

The management ECU 123 calculates a required output based on an accelerator pedal opening which corresponds to an operation of an accelerator pedal by a driver of the hybrid vehicle and a vehicle speed, switches driving force transmission systems, controls the engagement or disengagement of the clutch 117 and controls the engine 111. The control of the engine 111 by the management ECU 123 is indicated by an alternate long and short dash line in FIG. 1. The details of the management ECU 123 will be described later.

The motor ECU 125 controls the switching of switching elements which make up the converter 105, the first inverter 107 and the second inverter 115 to thereby control the operation of the electric motor 109 or the generator 113. The control of the converter 105, the first inverter 107 and the second inverter 115 by the motor ECU 125 is indicated by alternate long and short dash lines in FIG. 1.

The battery ECU 127 calculates a state of charge (SOC) of the battery 101 based on information on the battery temperature obtained from the temperature sensor 103, and charging and discharging currents and terminal voltage of the battery 101.

Figure 2:
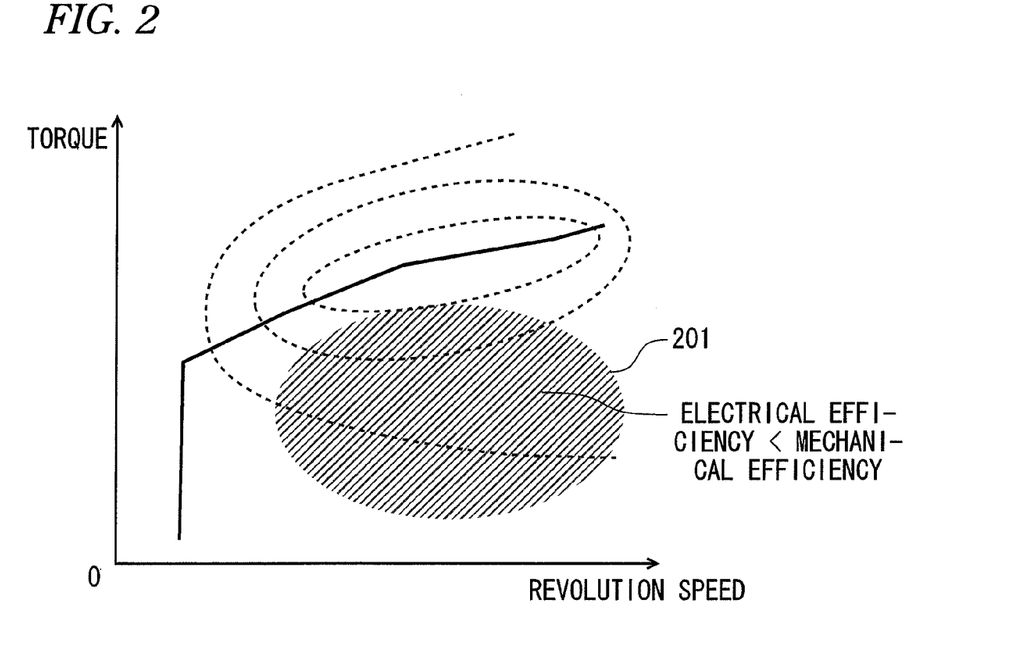
FIG. 2 shows characteristics of an engine 111 in relation to thermal efficiency.

FIG. 2 shows characteristics of the engine 111 in relation to thermal efficiency thereof. In FIG. 2, an ordinates axis denotes the torque of the engine 111, and an abscissas axis denotes the revolution speed of the engine 111. In FIG. 2, a thick solid line is a line which connects operation points of the engine 111 where an optimum specific fuel consumption is attained (a BSFC bottom line). The clutch 117 is engaged or disengaged in accordance with the driving force transmission system selected. Namely, the clutch 117 is disengaged when the vehicle runs on the series drive mode and is engaged when the output of the engine 111 is used as mechanical energy.

The output energy of the engine 111 is mechanical energy. However, mechanical energy outputted by the engine 111 when the clutch 117 is disengaged is converted into electrical energy by the generator 113 and is thereafter used to drive the vehicle. An energy transmission efficiency adopted here is referred to as an "electrical efficiency," and a transmission form of energy adopted is referred to as an "electrical transmission." On the other hand, mechanical energy outputted by the engine 111 when the clutch 117 is engaged is consumed as it is via the generator 113 and the gear 119 to drive the vehicle. An energy transmission efficiency adopted here is referred to as a "mechanical efficiency," and a transmission form of energy adopted is referred to as a "mechanical transmission." The region 201 shown by slant lines in FIG. 2 indicates a region where the mechanical efficiency is better than the electrical efficiency as the transmission efficiency of the output energy of the engine 111.

Figure 3:
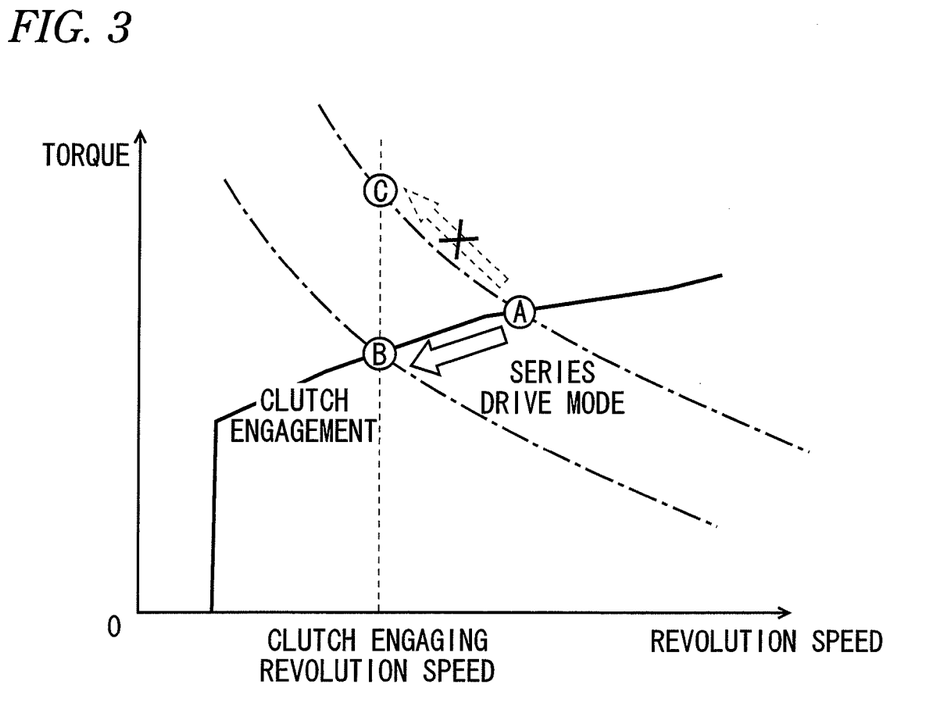
FIG. 3 shows a transition of an operation point of the engine 111 when a revolution speed of the engine 111 during the series drive mode is faster than a revolution speed at which a clutch 117 is engaged.
Figure 4:
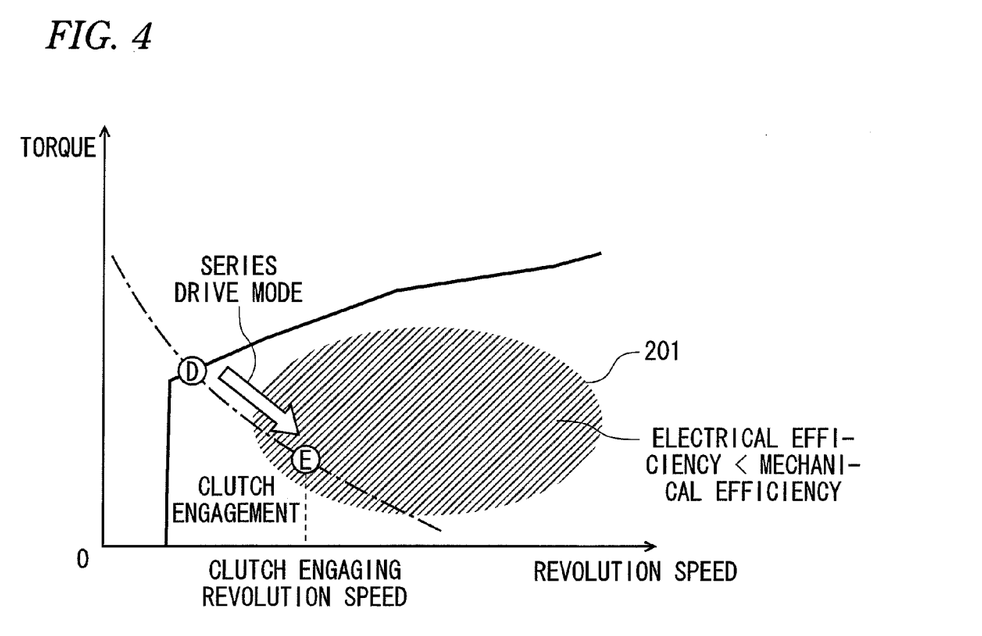
FIG. 4 shows a transition of the operation point of the engine 111 when the revolution speed of the engine 111 during the series drive mode is slower than the revolution speed at which the clutch 117 is engaged.

Hereinafter, the transition of an operation point of the engine 111 occurring when the clutch 117 is engaged while the hybrid vehicle of this embodiment runs on the series drive mode will be described by reference to FIGS. 3 and 4. FIG. 3 shows a transition of the operation point of the engine 111 when a revolution speed of the engine 111 during the series drive mode is faster than a revolution speed at which the clutch 117 is engaged. FIG. 4 shows a transition of the operation point of the engine 111 when the revolution speed of the engine 111 during the series drive mode is slower than the revolution speed at which the clutch 117 is engaged.

(Embodiment 1)

An operation point A shown in FIG. 3 is an operation point of the engine 111 which results when the hybrid vehicle is running on the series drive mode (accelerating) by use of driving force supplied from the electric motor 109 according an operation of an accelerator pedal by the driver. In dropping from this state the revolution speed of the engine 111 to a value indicated by a broken line in FIG. 3 where no shock is generated even when the clutch 117 is engaged (a clutch engaging revolution speed), when an output on an output side of the clutch 117 is caused to coincide with the output of the electric motor 109 while following the required output, the operation point of the engine 111 shifts from A to C along an equal-output line indicated by an alternate long and short dash line. As this occurs, the operation point deviates from the BSFC bottom line, and therefore, the specific fuel consumption is deteriorated.

In this embodiment, the management ECU 123 does not engage the clutch 117 until the revolution speed of the engine 111 when the hybrid vehicle runs on the series drive mode. Namely, when the operation point of the engine 111 shifts from A to B along the BSFC bottom line while following the required output so that the revolution point of the engine 111 decreased to the clutch engaging revolution speed, the management ECU 123 controls the clutch 117 to be engaged. When the operation point of the engine 111 reaches the operation point B, the revolution speed of the generator 113 and the revolution speed of the engine 111 coincide, respective symbols of angular speeds of the revolution speeds coincide, and the output of the engine 111 via the generator 113 and the output of the electric motor 109 coincide. Consequently, even when the clutch 117 is engaged at this time, no shock is generated, and the good specific fuel consumption of the engine 111 is kept as it is.

(Embodiment 2)

An operation point D shown in FIG. 4 is an operation point of the engine 111 which results when the hybrid vehicle is running on the series drive mode (cruising, decelerating) by use of driving force supplied from the electric motor 109 according an operation of an accelerator pedal by the driver. In dropping from this state the revolution speed of the engine 111 to a value indicated by a broken line in FIG. 4 where no shock is generated even when the clutch 117 is engaged (a clutch engaging revolution speed), when an output on the output side of the clutch 117 is caused to coincide with the output of the electric motor 109 while following the required output, the operation point of the engine 111 shifts from D to E along an equal-output line indicated by an alternate long and short dash line. In this way, when the operation point of the engine 111 shifts to the operation point E and the revolution speed of the engine rises up to the clutch engaging revolution speed, the management ECU 123 controls the clutch 117 to be engaged.

When the operation point shifts from D to E in this way, the specific fuel consumption is deteriorated because the operation point of the engine 111 deviates from the BSFC bottom line. However, being different from Embodiment 1, the load (torque) of the engine 111 shifts in a direction in which the load (torque) is reduced, and the operation point E stays within a region 201 where the mechanical transmission is better than the electrical transmission. Because of this, no shock is generated when the clutch 117 is engaged, and a better overall efficiency (=specific fuel consumption× mechanical efficiency) than an overall efficiency (=specific fuel consumption×electrical efficiency) which would result when the hybrid vehicle continues to run on the series drive mode is obtained.

Figure 5:
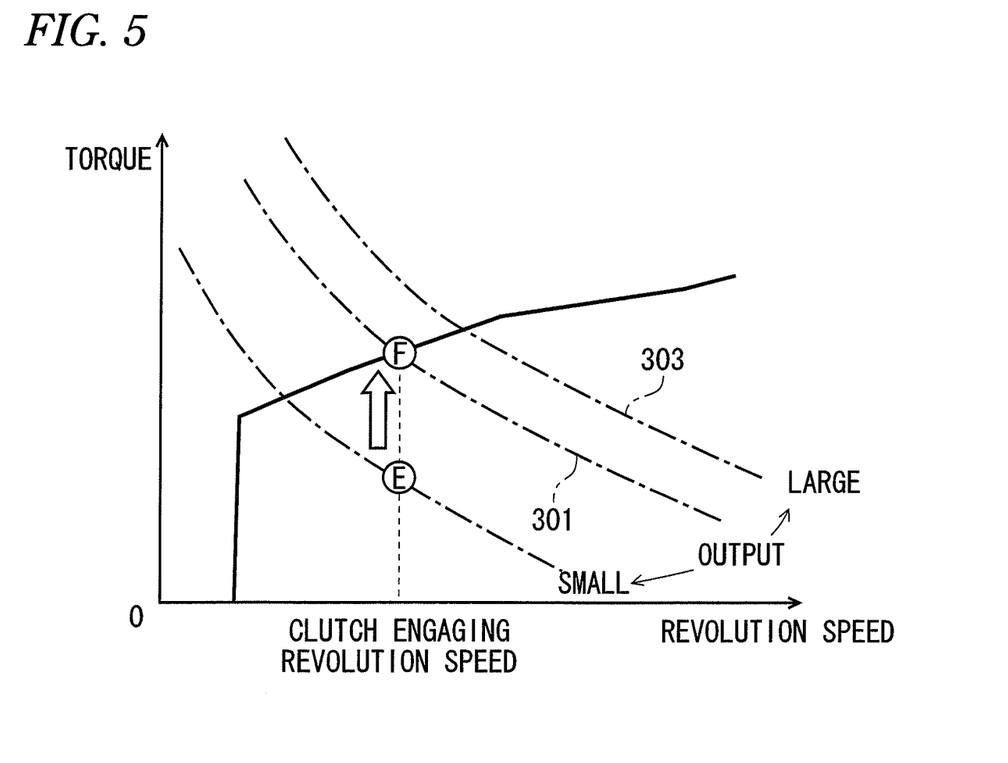
FIG. 5 shows a transition of the operation point of the engine 111 when a required output increases after the clutch 117 is engaged.

When the required output increases as a result of an operation of the accelerator pedal by the driver after the operation point has shifted to E, as shown in FIG. 5, the management ECU 123 controls the engine 111 to increase the torque while keeping the revolution speed at the clutch engaging revolution speed. When this occurs, the operation point of the engine 111 is shifted upwards in FIG. 4 from the operation point E.

When an output indicated by an alternate long and short dash line indicated by reference numeral 301, for example, is required as a required output, the management ECU 123 controls the engine 111 to increase the torque while keeping the revolution speed as it is so as to operate at an operation point F on the BSFC bottom line. Further, when the required output increases to an output indicated by an alternate long and short dash line denoted by reference numeral 303, the management ECU 123 controls the engine 111 to keep operating at the operation point F and instructs the motor ECU 125 to cause the electric motor 109 to output electric power corresponding to an insufficient output (=the required output−the output of the engine 111). The electric motor 109 is then driven by electric power supplied from the battery 101. Consequently, the engine 111 can continue to operate while keeping the good overall efficiency.

However, depending upon the state of the battery 101, there may be a situation in which the electric motor 109 cannot output electric power corresponding to the insufficient output. For example, when the state of charge (SOC) of the battery 101 is low, there may be a situation in which the electric motor 109 cannot supply electric power required of the electric motor 109. Additionally, when the temperature of the battery 101 is low, the output electric power of the battery 101 is decreased. Consequently, the management ECU 123 instructs the motor ECU 125 to cause the electric motor 109 to output electric power corresponding to the insufficient output within an available outputting capacity according to the SOC and temperature of the battery 101 obtained from the battery ECU 127. The battery ECU 127 calculates the SOC of the battery 101 based on an integral value of charging and discharging currents of the battery 101 and a terminal voltage of the battery 101.

Figure 6:
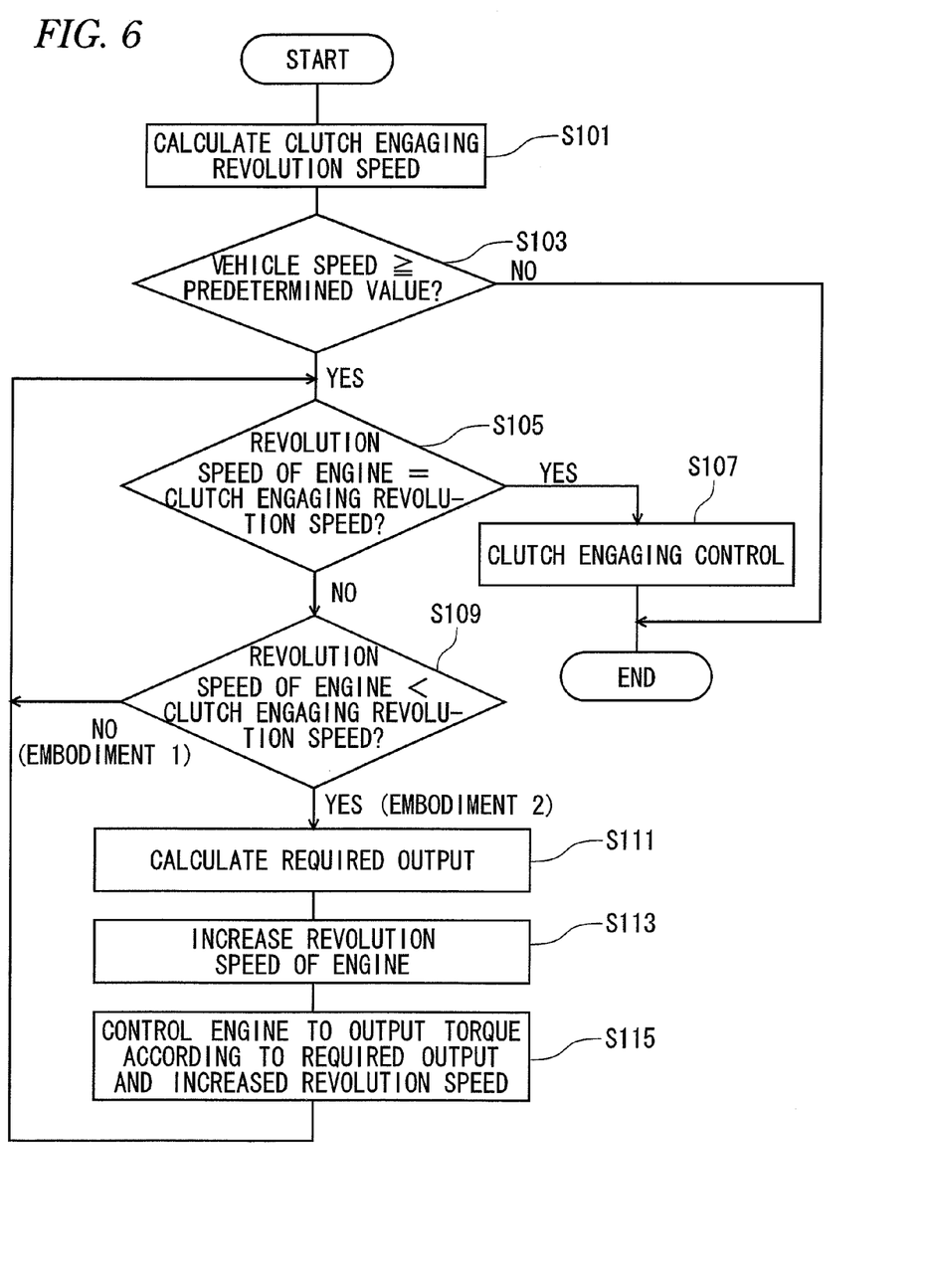
FIG. 6 shows operations of a management ECU 123.

Hereinafter, referring to FIG. 6, operations of the management ECU 123 will be described which include the control of the engine 111 and the engagement of the clutch 117. FIG. 6 shows operations of the management ECU 123. When the hybrid vehicle is running on the series drive mode, as shown in FIG. 6, the management ECU 123 calculates a revolution speed of the engine 111 at which no shock is generated even when the clutch 117 is engaged (a clutch engaging revolution speed) (step S101). In step S101, the management ECU 123 calculates a revolution speed of the drive shaft 131 based on the vehicle speed obtained from the vehicle speed sensor 121 and a radius of the drive wheel 133. A revolution speed on the output side of the clutch 117 engaged is calculated from the revolution speed of the drive shaft 131 and the gear ratio of the gear 119. Since the engine 111 is connected to the clutch 117 via a rotor of the generator 113, the revolution speed so calculated becomes the clutch engaging revolution speed.

After having completed the operation in step S101, the management ECU 123 determines whether or not the vehicle speed is a predetermined value or faster (step S103). If it determines that the vehicle speed is slower than the predetermined value, the management ECU 123 ends the operation. On the other hand, if it determines that the vehicle speed is the predetermined speed or faster, the management ECU 123 determines whether or not the revolution speed of the engine 111 equals the clutch engaging revolution speed (step S105). If it determines that the revolution speed of the engine 111 equals the clutch engaging revolution speed, the management ECU 123 proceeds to step S107, whereas if it determines that the revolution speed of the engine 111 does not equal to the clutch engaging revolution speed, the management ECU proceeds to step S109. In step S107, the management ECU 123 controls the clutch 117 to be engaged.

In step S109, the management ECU 123 determines whether or not the revolution speed of the engine 111 is slower than the clutch engaging revolution speed. If it determines that the revolution speed of the engine 111 is slower than the clutch engaging revolution speed, the management ECU 123 proceeds to step S111, whereas if it determines that the revolution speed of the engine 111 is faster than the clutch engaging revolution speed, the management ECU 123 returns to step S105. In step S111, the management ECU 123 calculates a required output based on an accelerator pedal opening which corresponds to an operation of the accelerator pedal by the driver of the hybrid vehicle and a vehicle speed. Hereinafter, the management ECU 123 gradually increases the revolution speed of the engine 111 while maintaining the output of the engine 111.

In step S113, the management ECU 123 controls the engine 111 to increase the revolution speed by a predetermined revolution speed (for example, 10 rpm). As this occurs, the management ECU 123 controls the revolution speed of the engine 111 by the generator 113 which is a load of the engine 111. Next, the management ECU 123 controls the engine 111 to output torque calculated from the required torque calculated in step S111 and the revolution speed of the engine 111 increased in step S113 (step S115) and then returns to step S105.

Thus, in the event that the controls by the management ECU 123 which are described above are executed in the hybrid vehicle of the embodiment, the clutch can be engaged without generation of any shock or reduction in efficiency (specific fuel consumption or overall efficiency) when the vehicle is shifted from the series drive mode to the another drive mode in which at least the engine 111 works as a drive source.

While the invention has been described in detail or by reference to the specific embodiments, it is obvious to those skilled in the art that various alterations or modifications can be made to the invention without departing from the spirit and scope of the invention.

This patent application is based on Japanese Patent Application (No. 2009-285415) filed on Dec. 16, 2009, the contents of which are incorporated herein by reference.

DESCRIPTION OF REFERENCE NUMERALS AND SIGNS

101 Battery (BATT); 103 Temperature sensor (TEMP); 105 Converter (CONV); 107 First inverter (1$^{st}$ INV); 109 Electric motor (MOT); 111 Engine (ENG); 113 Generator (GEN); 115 Second inverter (2$^{nd}$ INV); 117 Lockup clutch; 119 Gearbox; 121 Vehicle speed sensor; 123 Management ECU (FI/MG ECU); 125 Motor ECU (MOT/GEN ECU); 127 Battery ECU (BATT ECU); 131 Drive shaft; 133 Drive wheel

The invention claimed is:

1. A hybrid vehicle including
an engine,
a generator which is directly connected with the engine and which generates electric power by being driven by the engine,
a battery which stores electric power input thereto,
an electric motor which is provided separately from the generator which is connected to a drive wheel and which is driven by being supplied with at least one of the electric power stored in the battery and the electric power generated by the generator,
a power transmission engaging/disengaging unit which is disposed between the generator and the drive wheel to thereby engage and disengage a power transmission line from the engine to the drive wheel via the generator,
an engaging revolution speed calculation unit which calculates an engagement revolution speed at which a drive wheel side and an engine side of the power transmission engaging/disengaging unit are to be engaged,
an engine control unit which controls the engine,
an engaging/disengaging control unit which controls the power transmission engaging/disengaging unit to be engaged when a revolution speed of the engine coincides with the engaging revolution speed while the hybrid vehicle is shifted from a series drive mode in which the power transmission engaging/disengaging unit is disengaged and the electric motor being driven by the electric power generated from the generator driven by the engine works as a drive source to an engine-directly-connected drive mode in which the power transmission engaging/disengaging unit is engaged and at least the engine works as a drive source, and
a required output calculation unit which calculates a required output required of the hybrid vehicle based on an accelerator pedal opening which corresponds to an operation of an accelerator pedal and a running speed of the hybrid vehicle, wherein, when the hybrid vehicle is running on the series drive mode at a predetermined vehicle speed or faster and the revolution speed of the engine is slower than the engaging revolution speed, the engine control unit controls the engine to operate along an equal-output line on an engine performance curve which connects operation points of the engine where the required output is maintained such that, as a result of controlling the engine to operate along the equal-output line, the revolution speed of the engine is increased to coincide with the engaging revolution speed in a region on the engine performance curve where a mechanical efficiency is better than an electrical efficiency as an energy transmission efficiency from the engine to the drive wheel.

2. The hybrid vehicle of claim 1, wherein the engine control unit controls the engine to increase the torque while keeping the revolution speed at the engaging revolution speed until the operation point of the engine reaches an optimum fuel consumption line when the required output increases after the power transmission engaging/disengaging unit is engaged, and wherein, when the required output exceeds the output of the engine at the operation point on the optimum fuel consumption line, the electric motor driven by electric power supplied from the battery outputs electric power corresponding to an insufficient output of the engine.

3. The hybrid vehicle of claim 2,
wherein the electric motor outputs electric power corresponding to the insufficient output within an available outputting capacity according to the state of the battery.

4. The hybrid vehicle of claim 1,
wherein the engine control unit calculates an operation point of the engine, the engine being controlled to follow the required output calculated by the required output calculation unit while the hybrid vehicle is running on the series drive mode at a predetermined vehicle speed or faster, and
wherein the engaging/disengaging control unit controls the power transmission engaging/disengaging unit to be engaged when the operation point calculated by the engine control unit enters the region.

5. A control method for a hybrid vehicle, the hybrid vehicle including
an engine,
a generator which is directly connected with the engine and which generates electric power by being driven by the engine
a battery which stores electric power input thereto,
an electric motor which is provided separately from the generator, which is connected to a drive wheel and which is driven by being supplied with at least one of the electric power stored in the battery and the electric power generated by the generator,
a power transmission engaging/disengaging unit which is disposed between the generator and the drive wheel to thereby engage and disengage a power transmission line from the engine to the drive wheel via the generator,
the control method including
calculating an engagement revolution speed at which a drive wheel side and an engine side of the power transmission engaging/disengaging unit are to be engaged,
calculating a required output required of the hybrid vehicle based on an accelerator pedal opening which corresponds to an operation of an accelerator pedal and a running speed of the hybrid vehicle, and
engaging the power transmission engaging/disengaging unit to shift the hybrid vehicle from a series drive mode in which the power transmission engaging/disengaging unit is disengaged and the electric motor being driven by the electric power generated from the generator driven by the engine works as a drive source to an engine-directly-connected drive mode in which the power transmission engaging/disengaging unit is engaged and at least the engine works as a drive source when a revolution speed of the engine coincides with the engaging revolution speed, wherein, engaging further includes, when the hybrid vehicle is running on the series drive mode at a predetermined vehicle speed or faster and the revolution speed of the engine is slower than the engaging revolution speed, controlling the engine to operate along equal-output line on an engine performance curve which connects operation points of the engine where the required output is maintained such that, as a result of controlling the engine to operate along the equal-output line, the revolution speed of the engine is increased to coincide with the engaging revolution speed in a region on the engine performance curve where a mechanical efficiency is better than an electrical efficiency as an energy transmission efficiency from the engine to the drive wheel.

\* \* \* \* \*